United States Patent
Hiltgen

(10) Patent No.: US 7,103,889 B2
(45) Date of Patent: Sep. 5, 2006

(54) METHOD, SYSTEM, AND ARTICLE OF MANUFACTURE FOR AGENT PROCESSING

(75) Inventor: Daniel K. Hiltgen, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 624 days.

(21) Appl. No.: 10/202,662

(22) Filed: Jul. 23, 2002

(65) Prior Publication Data

US 2004/0216126 A1    Oct. 28, 2004

(51) Int. Cl.
G06F 9/44 (2006.01)
(52) U.S. Cl. ................... 719/317; 709/202; 709/229
(58) Field of Classification Search .............. 709/202, 709/229; 719/310, 317; 707/10; 711/118; 712/225
See application file for complete search history.

(56) References Cited

U.S. PATENT DOCUMENTS

| | | | |
|---|---|---|---|
| 2,012,527 A | 8/1935 | Batchelder | |
| 2,675,228 A | 4/1954 | Baird et al. | |
| 3,571,677 A | 3/1971 | Oeschger | |
| 4,138,692 A | 2/1979 | Meeker | |
| 4,228,219 A | 10/1980 | Hoy et al. | |
| 4,558,395 A | 12/1985 | Yamada | |
| 4,665,466 A | 5/1987 | Green | |
| 4,721,996 A | 1/1988 | Tustaniwskyj | |
| 4,729,424 A | 3/1988 | Mizuno | |
| 4,733,331 A | 3/1988 | Chauvet | |
| 4,791,983 A | 12/1988 | Nicol | |
| 4,809,134 A | 2/1989 | Tustaniwskyj | |
| 4,870,477 A | 9/1989 | Nakanishi | |
| 4,882,654 A | 11/1989 | Nelson | |
| 4,977,444 A | 12/1990 | Nakajima | |
| 5,144,531 A | 9/1992 | Go | |
| 5,166,863 A | 11/1992 | Shmunis | |
| 5,177,667 A | 1/1993 | Graham | |
| 5,183,104 A | 2/1993 | Novotny | |
| 5,282,847 A | 2/1994 | Trescony et al. | |
| 5,305,461 A * | 4/1994 | Feigenbaum et al. | ....... 712/225 |
| 5,323,847 A | 6/1994 | Koizumi | |

(Continued)

FOREIGN PATENT DOCUMENTS

EP    0 623 876 A1    11/1994

(Continued)

OTHER PUBLICATIONS

Mukfopadhy et al. "Multi-agent Marko v decision processes with limited agent communication" 2001 IEEE, pp. 7-12.☐☐.*

(Continued)

*Primary Examiner*—William Thomson
*Assistant Examiner*—Van Nguyen
(74) *Attorney, Agent, or Firm*—Kudirka & Jobse, LLP

(57) ABSTRACT

Disclosed is a system, method, and article of manufacture for agent processing. In particular, an agent may be executed within an address space of an invoking process that invoked the agent or may be executed in a separate address space. While the agent is processing, the execution of the agent within the address space of the invoking process may be switched to execution of the agent within the separate address space. Similarly, while the agent is processing, the execution of the agent in the separate address space may be switched to execution of the agent in the address space of the invoking process. Moreover, if the invoking process terminates before completing processing, when the invoking process restarts, the invoking process redetermines which agents should be executed in separate address spaces based on information stored before the invoking process terminated.

18 Claims, 15 Drawing Sheets

U.S. PATENT DOCUMENTS

| | | |
|---|---|---|
| 5,406,807 A | 4/1995 | Ashiwake |
| 5,465,192 A | 11/1995 | Yoshikawa |
| 5,504,858 A | 4/1996 | Ellis et al. |
| 5,535,094 A | 7/1996 | Nelson |
| 5,588,119 A | 12/1996 | Vincent |
| 5,659,701 A * | 8/1997 | Amit et al. ................. 719/317 |
| 5,675,473 A | 10/1997 | McDunn |
| 5,701,045 A | 12/1997 | Yokozawa |
| 5,706,668 A | 1/1998 | Hilpert |
| 5,751,933 A | 5/1998 | Dev |
| 5,771,388 A | 6/1998 | Mondrik et al. |
| 5,912,802 A | 6/1999 | Nelson |
| 5,940,269 A | 8/1999 | Ko |
| 5,950,011 A | 9/1999 | Albrecht |
| 5,956,750 A | 9/1999 | Yamamoto et al. |
| 6,006,251 A | 12/1999 | Toyouchi et al. |
| 6,029,742 A | 2/2000 | Burward-Hoy |
| 6,031,528 A | 2/2000 | Langfahl |
| 6,050,327 A | 4/2000 | Gates |
| 6,058,426 A * | 5/2000 | Godwin et al. ............. 709/229 |
| 6,067,545 A | 5/2000 | Wolff |
| 6,067,559 A * | 5/2000 | Allard et al. ............... 709/202 |
| 6,101,616 A | 8/2000 | Joubert |
| 6,118,776 A | 9/2000 | Berman |
| 6,119,118 A * | 9/2000 | Kain et al. ................... 707/10 |
| 6,125,924 A | 10/2000 | Lin |
| 6,130,820 A | 10/2000 | Konstad |
| 6,135,200 A | 10/2000 | Okochi |
| 6,137,680 A | 10/2000 | Kodaira |
| 6,144,379 A | 11/2000 | Bertram |
| 6,151,031 A | 11/2000 | Atkins et al. |
| 6,151,331 A | 11/2000 | Wilson |
| 6,167,445 A | 12/2000 | Gai et al. |
| 6,182,142 B1 | 1/2001 | Win et al. |
| 6,205,796 B1 | 3/2001 | Chu |
| 6,205,803 B1 | 3/2001 | Scaringe |
| 6,213,194 B1 | 4/2001 | Chrysler |
| 6,229,538 B1 | 5/2001 | McIntyre |
| 6,243,747 B1 | 6/2001 | Lewis et al. |
| 6,301,605 B1 | 10/2001 | Napolitano et al. |
| 6,313,990 B1 | 11/2001 | Cheon |
| 6,314,555 B1 * | 11/2001 | Ndumu et al. ............... 717/101 |
| 6,381,637 B1 | 4/2002 | Kamada |
| 6,392,667 B1 | 5/2002 | McKinnon et al. |
| 6,396,697 B1 | 5/2002 | Chen |
| 6,408,336 B1 | 6/2002 | Schneider et al. |
| 6,425,005 B1 | 7/2002 | Dugan et al. |
| 6,425,007 B1 | 7/2002 | Messinger |
| 6,438,984 B1 | 8/2002 | Novotny |
| 6,463,454 B1 | 10/2002 | Lumelsky et al. |
| 6,477,572 B1 | 11/2002 | Elderton |
| 6,487,643 B1 * | 11/2002 | Khare et al. ................. 711/150 |
| 6,496,871 B1 * | 12/2002 | Jagannathan et al. ....... 719/317 |
| 6,505,244 B1 | 1/2003 | Natarajan et al. |
| 6,526,768 B1 | 3/2003 | Wall |
| 6,542,360 B1 | 4/2003 | Koizumi |
| 6,574,708 B1 * | 6/2003 | Hayter et al. ............... 711/118 |
| 6,587,343 B1 | 7/2003 | Novotny |
| 6,604,136 B1 | 8/2003 | Change et al. |
| 6,604,137 B1 | 8/2003 | Cowan |
| 6,628,304 B1 | 9/2003 | Mitchell |
| 6,636,239 B1 | 10/2003 | Arquie |
| 6,658,526 B1 | 12/2003 | Nguyen et al. |
| 6,671,776 B1 | 12/2003 | DeKoning |
| 6,704,778 B1 | 3/2004 | Horman |
| 6,714,936 B1 | 3/2004 | Nevin |
| 6,760,761 B1 | 7/2004 | Sciacca |
| 6,772,204 B1 | 8/2004 | Hansen |
| 6,775,700 B1 | 8/2004 | Cheng et al. |
| 6,799,208 B1 | 9/2004 | Sankaranarayan et al. |
| 6,804,773 B1 * | 10/2004 | Grigsby et al. ................ 713/1 |
| 6,823,382 B1 | 11/2004 | Stone |
| 6,834,298 B1 | 12/2004 | Singer et al. |
| 6,845,395 B1 | 1/2005 | Blumenau et al. |
| 6,871,232 B1 | 3/2005 | Curie et al. |
| 6,978,291 B1 * | 12/2005 | Vardi et al. ................. 709/202 |
| 2001/0043617 A1 | 11/2001 | McKinnon |
| 2001/0044907 A1 | 11/2001 | Yoshimoto et al. |
| 2002/0019864 A1 | 2/2002 | Mayer |
| 2002/0069377 A1 | 6/2002 | Mabuchi et al. |
| 2002/0083169 A1 | 6/2002 | Aki et al. |
| 2002/0113816 A1 | 8/2002 | Mitchell et al. |
| 2002/0133669 A1 | 9/2002 | Devireddy et al. |
| 2002/0143905 A1 | 10/2002 | Govindarajan et al. |
| 2002/0143920 A1 | 10/2002 | Dev et al. |
| 2002/0147801 A1 | 10/2002 | Gullotta et al. |
| 2002/0152305 A1 | 10/2002 | Jackson et al. |
| 2002/0162010 A1 | 10/2002 | Allen et al. |
| 2002/0169858 A1 | 11/2002 | Bellinger et al. |
| 2002/0178380 A1 | 11/2002 | Wolf et al. |
| 2002/0184300 A1 | 12/2002 | Schmelling et al. |
| 2002/0188584 A1 | 12/2002 | Ghannam |
| 2002/0194407 A1 | 12/2002 | Kim |
| 2003/0028624 A1 | 2/2003 | Hasan et al. |
| 2003/0055972 A1 | 3/2003 | Fuller et al. |
| 2003/0074599 A1 | 4/2003 | Golasky et al. |
| 2003/0091037 A1 | 5/2003 | Latif et al. |
| 2003/0093501 A1 | 5/2003 | Carlson et al. |
| 2003/0169289 A1 | 9/2003 | Holt |
| 2003/0184580 A1 | 10/2003 | Kodosky et al. |
| 2004/0024573 A1 | 2/2004 | Allen |

FOREIGN PATENT DOCUMENTS

| | | |
|---|---|---|
| EP | 0 773 649 A2 | 5/1997 |
| EP | 1 111 840 A2 | 6/2001 |
| GB | 2 278 468 A | 11/1994 |
| GB | 2 344 963 A1 | 6/2000 |
| GB | 2 354 611 A1 | 3/2001 |
| WO | WO9842102 A1 | 9/1998 |
| WO | WO0029954 A1 | 5/2000 |
| WO | WO0072183 A2 | 11/2000 |
| WO | WO0130007 A2 | 4/2001 |
| WO | WO0225870 A1 | 3/2002 |
| WO | WO02089418 A1 | 11/2002 |
| WO | WO03014911 A1 | 2/2003 |

OTHER PUBLICATIONS

Cazalens et al. "A web site indexing process for an Internet information retrieval agent system" 2000 IEEE, pp. 254-258.□□.*

Blake "An agent-based cross-organizational; workflow architecture in support of web services" 2002 IEEE, pp. 1-6.*

Huang "Using Intelligent Agents to manage Fuzzy Business Process" 2001 IEEE, pp. 508-523.*

Anonymous, "Jini: New Technology for a Networked World", Jun. 30, 1999, p. pp. 1-5.

Anonymous, "Pattern: Blackboard", http://www.vico.org/pages/Patrons%20Blackboard, Jul. 12, 2002, p. pp. 1-2.

Anonymous, "Javaone—Sun's 2000 Worldwide Java Developer Conference", Nov. 24, 2003.

Brent Knight, "Reducing the Complexity of Managing Private Loops", / /, p. 1-11.

Bushman, "Pattern Oriented Software Architecture, A System of Patterns", / /, p. 71-95, John Wiley & Sons, New York.

Dupuy, et al., "Netmate: A Network Management Environment", IEEE Network, Mar. 5, 1991, p. 35-40, 43, New York.

Finke, et al., "Distribution and Inheritance in the HERON Approach to Heterogeneous Computing", Proceedings of the Int'l Conf on Distributed Computing Systems, May 25, 1993, p. 399-408, IEEE Comp Soc Press, Los Alamitos.

Richard, "Fibre Channel as a Network Backbone", WESCON/94, IDEA/Microelectronics, Conference record Anaheim, p. 653-659, New York.

Business Editors & High-Tech Writers, "Tivoli Simplifies SAN Management", Business Wire, Oct. 9, 2000, New York.

"Specification for CIM Operations over HTTP", Distributed Management Task Force, Inc., May 2, 2002, pp. 1-102.

Anonymous, "Jiro Technology Technical Overview", 2000.

Anonymous, "Sun's Managed Storage Networks", 2000.

Anonymous, "Jiro Technical Overview White Paper, Free White Papers/Tech Bulletins, Sun-Solve Search Result", Jun. 28, 2000.

Anonymous, "Managed Storage Networks White Paper, Free White Papers/Tech Bulletins, Sun-Solve Search Result", Jun. 28, 2000.

Martin, Jean-Christophe, "Policy-Based Networks", Date Unknown.

* cited by examiner

METHOD, SYSTEM, AND ARTICLE OF MANUFACTURE FOR AGENT PROCESSING

BACKGROUND OF THE INVENTION

1. Field of the Invention

The present invention is related to a method, system, and article of manufacture for agent processing.

2. Description of the Related Art

A client computer on which client applications run may be connected by a network, such as the Internet, to a server computer. The Internet is a world-wide collection of connected computer networks (i.e., a network of networks). The server computer may be connected to several low level devices. One type of low level device is a redundant array of independent disks (RAID). A RAID device enables storage of the same data on multiple hard disks, thus allowing simultaneous accesses to the copies of data.

When a client application desires to access a low level device to, for example, retrieve data about the low level device (e.g., whether the low level device is online and available for use or offline and not available for use), the client application submits a request for the data to, for example, the server computer connected to the low level device. The server computer generates a process to handle the client application's request. The process is assigned a portion of memory, which is referred to as the address space of the process.

Moreover, agents implemented in software at the server computer may be used to handle low level device interactions. An agent performs some function, such as retrieving data about a low level device. Thus, the server computer may generate an agent to fulfill the client application's request.

In many cases, the agents may access hardware or third party libraries that have unknown stability levels (e.g., crash often). In some systems, the agents run in the same address space as the process (e.g., a server process) that executed the agents. If agents are permitted to run within the same address space as a process, when one agent fails (e.g., because it is accessing an unstable device), the entire process fails and must be restarted. If the process generates multiple agents, then the failure of one agent causes the termination of all of the agents. This, of course, causes disruptions for a client application.

A Common Gateway Interface (CGI) is a specification for transferring information between a World Wide Web ("Web") server and a CGI program. A CGI program may send multiple CGI requests (i.e., requests from a CGI program) to a Web server. Each request is handled by a CGI process, and each CGI process uses a separate address space. For example, if three CGI processes are invoked, each CGI process has a separate address space, resulting in the use of three different address spaces.

FastCGI is a programming interface that can speed up Web applications that use the Common Gateway Interface (CGI). In particular, FastCGI is a plug-in to a Web server computer that processes CGI requests received from a client computer. FastCGI manages multiple CGI requests with a single process that uses a single address space. Thus, if three CGI requests are received a the server computer, one CGI process using one address space handles all three CGI requests.

Thus, there is a need in the art for improved agent execution.

SUMMARY OF THE INVENTION

Provided are a method, system, and for processing a request. Initially, an agent that may process the request is identified. Whether the agent should be executed within an address space of an invoking process that would invoke the agent or within a separate address space is determined. If it is determined that the agent should be executed within a separate address space, the agent is executed within a separate address space.

In certain implementations, there are multiple agents and an agent is identified from the group of agents.

In additional implementations, determining whether the agent should be executed within an address space of an invoking process or within a separate address space is based on information in a configuration file. The configuration file includes an indication of whether an agent should be executed in a separate address space, a group identifier, and an indication of when to launch the agent.

In yet other implementations, it is determined when the agent should be launched. In certain implementations, the agent is launched when the invoking process starts. In certain implementations, the agent is launched when the request is received.

In further implementations, an agent has a group identifier and it is determined whether the agent is part of a group of agents sharing the group identifier. In certain implementations, when an agent is part of the group of agents sharing the group identifier and when the agent is executed within the separate address space, each of the agents in the group of agents are executed within that separate address space.

In additional implementations, it is determined that the agent has failed. If the agent was executed within the separate address space, the agent is restarted.

In yet other implementations, an indication to switch the agent that is executing within a separate address space to the agent that is executing within the address space of the invoking process that invoked the agent is received. The agent that is to be switched is terminated and executed within the address space of the invoking process. In certain implementations, the agent is part of a group of agents and each of the agents in the group is terminated and executed within the address space of the invoking process that invoked the agent.

In further implementations, an indication to switch the agent that is executing within an address space of an invoking process that invoked the agent to an agent that is executing in the separate address space is received. The agent that is executing within the address space of a process that invoked the agent is quiesced and executed within the separate address space.

In additional implementations, when the invoking process that has invoked the agent is restarted, a determination is made of which agents are to be executed in one or more separate address spaces based on information stored by the invoking process before it was restarted. Then, those agents are executed in the one or more separate address spaces.

The described implementations of the invention provide a method, system, and for agent processing. In particular, an agent may be forked or threaded. The designation of an agent as forked or threaded may be switched while the agent is processing. Moreover, if a process terminates before completing processing, when the process restarts, the process redetermines which agents should be forked based on information stored before the process terminated.

BRIEF DESCRIPTION OF THE DRAWINGS

Referring now to the drawings in which like reference numbers represent corresponding parts throughout.

DETAILED DESCRIPTION

Figure 1A:
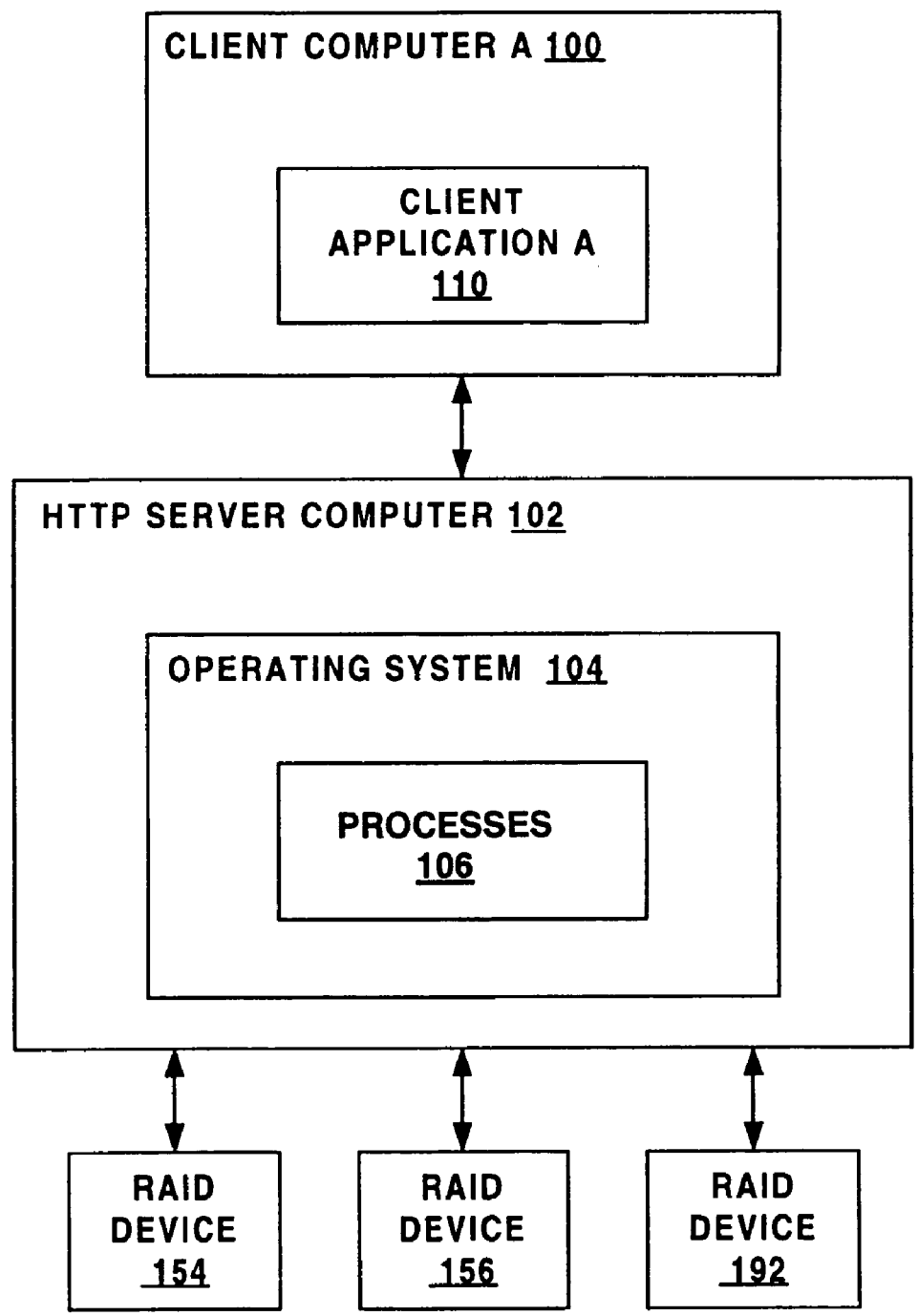
FIG. 1A illustrates, in a block diagram, an architecture in which the invention may be implemented in accordance with certain implementations of the invention.

In the following description, reference is made to the accompanying drawings which form a part hereof and which illustrate several implementations of the present invention. It is understood that other implementations may be utilized and structural and operational changes may be made without departing from the scope of the present invention.

In certain implementations of the invention, an agent may be executed within an address space of a process that is invoking the agent (an "invoking process") or may be executed within a secondary address space. When an agent is executed within an address space of a process that is invoking the agent, the agent is said to be a "threaded agent." When an agent is executed within a secondary address space, rather than the address space of the process that executed the agent, the agent is said to be a "forked agent."

The invention provides a common infrastructure to enable agents to be executed either within the same address space of a server computer process that receives a request from a client computer or executed within a separate address space. In certain implementations, the designation of an agent as threaded or forked is based on run time configurable parameters. In certain implementations, the designation of an agent as threaded or forked is dynamically determined based on past execution history of the agent. The designation of an agent as threaded or forked may be changed while the agent is executing.

With implementations of this invention, a system administrator may designate an agent as threaded or forked. For example, if a system administrator knows (e.g., from past testing experience) that a particular agent often fails (i.e., is unstable), then the system administrator may designate this agent as a forked agent that executes within a separate address space, rather than within the address space of a process that invoked the agent. On the other hand, if an agent is known to often complete successfully (i.e., does not terminate often and is stable), then the system administrator may designate the agent as a threaded agent that executes within the address space of the process that invoked the agent. When an agent that is executed within the address space of the process that invoked the agent fails, the process is terminated and restarted. When an agent that is executed in a separate address space fails, the agent (rather than the process) is terminated and restarted. Since an agent that is unstable may be executed within a separate address space, while an agent that is stable may be executed within the address space of the process that invoked the stable agent, the process will be more stable (i.e., it is less likely that the process will be terminated and restarted).

In certain implementations, an agent manages a low level device (e.g., a RAID device). For example, the agent may retrieve data on the state of the low level device. The data may indicate, for example, whether the low level device is online or offline, the status of spindles or temperature sensors at the low level device, or the number of volumes in a RAID device. The agent may also change the low level device (e.g., take a volume of a RAID device offline). In certain implementations, the agent may retrieve data stored on the low level device.

FIG. 1A illustrates, in a block diagram, an architecture in which the invention may be implemented in accordance with certain implementations. A client computer A 100 includes a client application A 110. The client computer A 100 is connected to a server computer, such as a Hypertext Transfer Protocol (HTTP) server computer 102. HTTP is an application protocol that provides a set of rules for exchanging files on the World Wide Web, which is a part of the Internet. The HTTP server 102 may include an HTTP daemon that waits for requests from client application 110. A daemon is a program that runs continuously and exists to handle certain (e.g., periodic) service requests that are expected. The daemon program forwards the requests to other components (e.g., programs or processes) for processing.

The HTTP server 102 is connected to RAID devices 154, 156, and 192. The HTTP server 102 includes an operating system 104, such as a UNIX® operating system. The operating system 104 generates one or more processes to perform various functions. The client application A 110 sends requests to the HTTP server 102 to access RAID devices 154, 156, and/or 192.

Figure 1B:
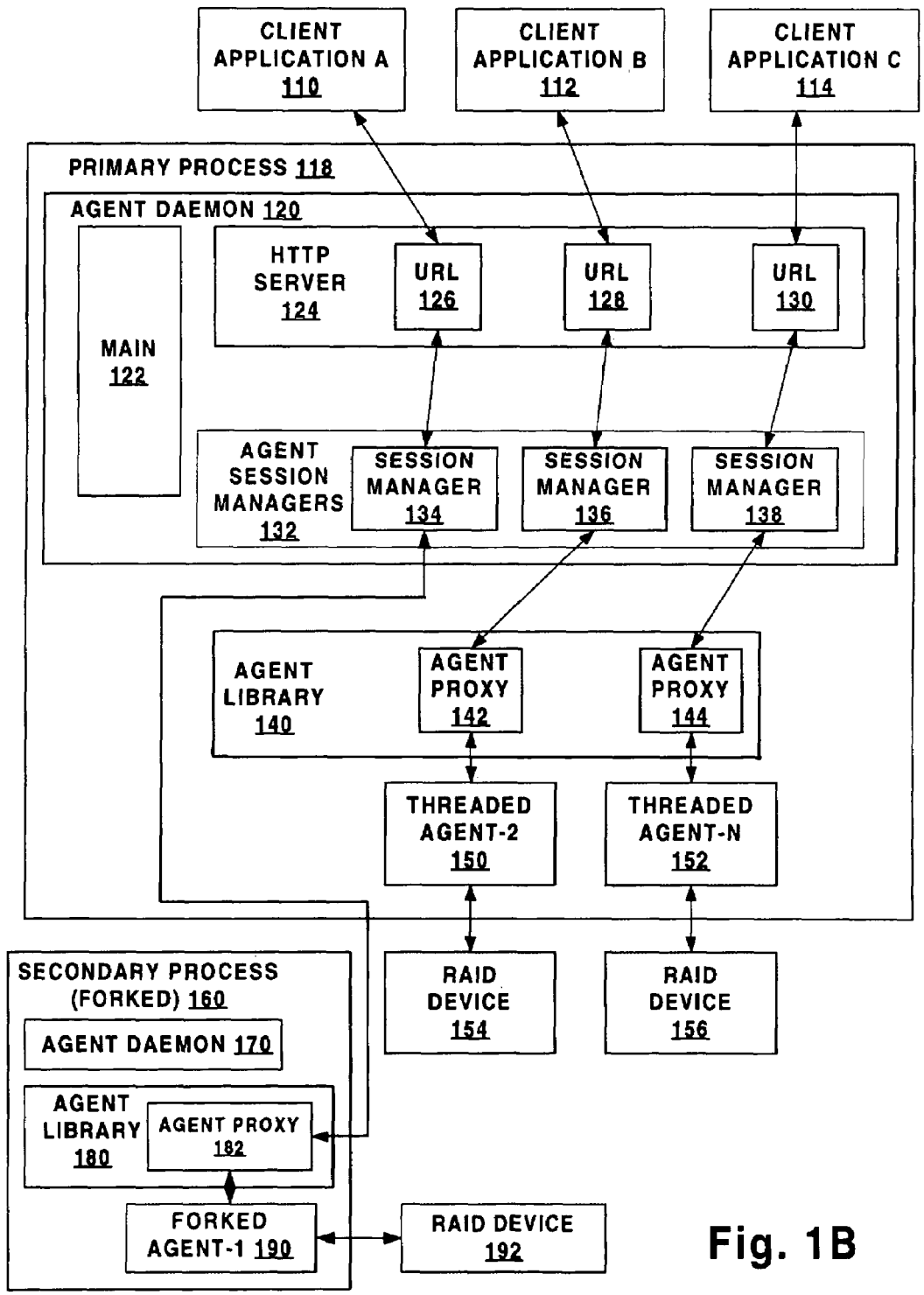
FIG. 1B illustrates, in a block diagram, further details of an architecture in which the invention may be implemented in accordance with certain implementations of the invention.
Figure 1C:
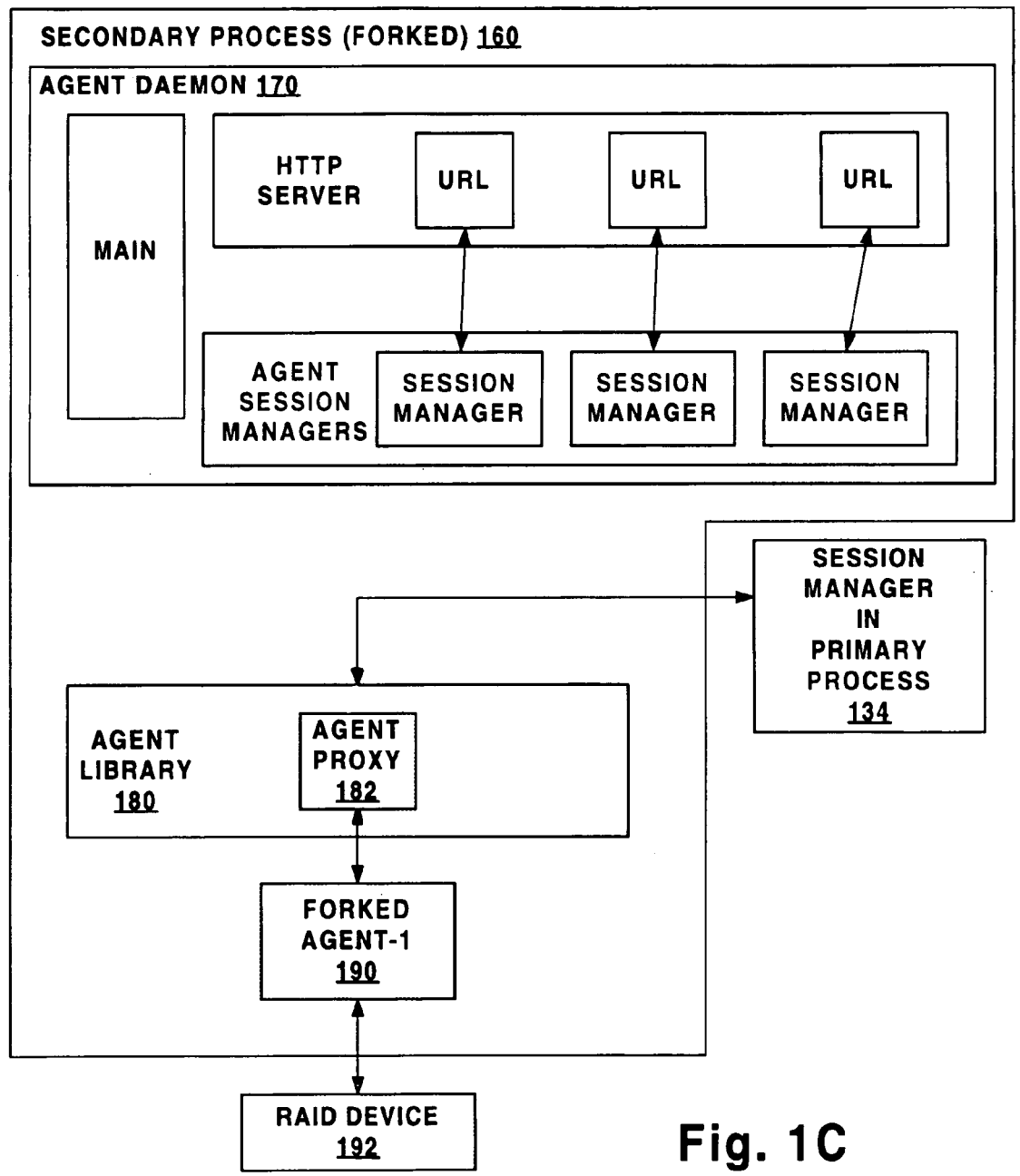
FIG. 1C illustrates further details of a secondary process in accordance with certain implementations of the invention.

FIG. 1B illustrates, in a block diagram, further details of an architecture in which the invention may be implemented in accordance with certain implementations, while FIG. 1C illustrates further details of a secondary process in accordance with certain implementations. Client A 100, Client B 102, and Client C 104 may make requests for agent services through a server interface, such as Hypertext Transfer Protocol (HTTP). In particular, a user may launch a client application 110, 112, or 114. The client application 110, 112, or 114 establishes a socket connection to a URL 126, 128, or 130 at the HTTP server 124. In some operating systems, such as the UNIX® operating system, a socket is a software object that enables a client application 110, 112, and 114 to use a network protocol. For example, in the UNIX® environment, a client application 110, 112, and 114 can send and receive Transmission Control Protocol/Internet Protocol (TCP/IP) messages by opening a socket and reading and writing data to and from the socket in order to communicate with a forked or threaded agent 150, 152, or 190.

In certain implementations, when the operating system 104 starts up, the operating system 104 invokes a primary process 118. The primary process 118 binds to uniform resource locators (URLS) (i.e., "ports") at the HTTP server 102. The primary process 118 may be a daemon. The primary process 118 may include an agent daemon 120 for servicing requests for agent services from client applications 110, 112, and 114.

The agent daemon 120 includes a main component 122 that starts up the agent daemon 120. The agent daemon 120 also includes a mapping to URLs 126, 128, and 130 at HTTP server 124 (which represents HTTP server 102 for the primary process). The agent daemon 120 also includes agent session managers 132. Agent session managers 132 includes session managers 134, 136, and 138 for managing agent proxies 142, 144, and 182. The agent proxies 142 and 144 are part of agent library 140, while agent proxy 182 is part of agent library 180. Each agent proxy 142, 144, and 182 manages a forked or threaded agent 150, 152, or 190. Threaded agent-N 152 is the nth agent. In certain implementations, the number of agents is set by a vendor who designed the agents. Each agent 150, 152, or 190 may be connected to a low level device, such as RAID devices 154, 156, and 192. In certain implementations, agents 150, 152, and 190 are written to an agent application programming interface (agent API). The agent API may be written in any programming language (e.g., a C language API or a Java language API). In FIG. 1A, an agent proxy 142, 144, or 182 manages the interaction with the agent 150, 152, or 190 through the agent API.

An HTTP server 124 process communicates with a session manager 134, 136, or 138. The session manager 134, 136, or 138 communicates with an agent 150, 152 or 190 through an agent proxy 142, 144, or 182. If the agent 190 is forked, the communication occurs over a form of interprocess communication (IPC). IPC is a set of programming interfaces used to manage processes executed by an operating system. IPC enables two or more processes to communicate with each other. If an agent 150 or 152 is threaded, a local procedure may be used to communicate with the agent. Neither the client application 110, 112, or 114 nor the agent 150, 152, or 190 needs to be aware of whether a particular agent 150, 152, or 190 is forked or threaded. In certain implementations, the client application 110, 112, or 114 or the agent 150, 152, or 190 may request information on whether a particular agent 150, 152, or 190 is forked or threaded.

Client application A 110 may make a request for agent services (e.g., obtaining data describing the state of RAID device 192 or data stored at RAID device 192) through a socket to URL 126. The request is passed on to a session manager, such as session manager 134. The session manager 134 determines which agent should process the request and whether the agent is a forked agent. To process a request, the agent retrieves data requested by the client (e.g., data describing a device or data stored on the device). The determination of which agent should process the request may be based on which agent is connected to a device from which the client application has requested data. For example, if client application A 110 has requested data about RAID device 192, then the session manager would assign agent-1 190 to process the request.

The determination of whether the selected agent is forked or threaded may be made, for example, with reference to a configuration file that specifies which agents are to be threaded and which are to be forked. In this example, the session manager 134 determines that the request should be passed to a forked agent. Additionally, the session manager 134 determines when to launch an agent. In particular, an agent may be classified as "lazy" or "immediate" in a configuration file. When the primary process 118 starts, the session managers 132 review the configuration file and determine whether any of the agents are immediate. Agents classified as immediate are launched when the primary process 118 starts. Agents classified as lazy are launched when a request from a client application 110, 112, or 114 is received. Table A illustrates a sample configuration file.

TABLE A

|  | Forked or Threaded Designation | Lazy or Immediate Designation | Group ID |
|---|---|---|---|
| Agent-1 | Forked | Lazy | 1 |
| Agent-2 | Threaded | Immediate | 2 |
| Agent-3 | Threaded | Lazy | 3 |

According to the configuration file of Table A, agent-1 190 is forked, is lazy (i.e., launched in response to a first client application request), and has group ID 1. Agent-2 150 is threaded, immediate (i.e., launched when the primary process 118 is launched), and has group ID 2. Agent-3 152 is threaded, lazy, and has group ID 3.

The group ID values are used when forking multiple agents. In certain implementations, multiple agents may be forked as a group so that they may logically work together and share data. The session manager 134, 136, or 138 determines whether to group two or more agents based on the group ID in the configuration file.

The session manager 134 invokes a secondary process 160. For ease of illustration, one secondary process 160 is shown. However, multiple additional processes may be invoked for additional forked agents. The secondary process 160 includes many of the components of the primary process, but does not include agent proxies 142 and 144 managing threaded agents 150 and 152, respectively, and does not include the threaded agents 150 and 152, as illustrated in FIG. 1C. The session manager 134 of the primary process 118 has a link to the agent proxy 182 in the secondary process 160. The agent proxy 182 manages forked agent-1 190, which may access RAID device 192.

Moreover, client application B 112 may make a request for agent services to access RAID device 154 through a socket to URL 128. The request is passed on to session manager 136. The session manager 136 determines which agent should process the request and whether the agent is a forked agent. In this example, the session manager 136 determines that the request should be passed to a threaded agent-2 150. The session manager 136 passes the request to agent proxy 142, which manages threaded agent-2 150. Threaded agent-2 150 processes the request.

FIG. 1C illustrates further details of secondary process 160 in accordance with certain implementations. In particular, the secondary process 160 illustrates that agent proxy 182 manages forked agent-1 190. Agent proxy 182 is managed by session manager 134 in primary process 118.

Figure 1D:
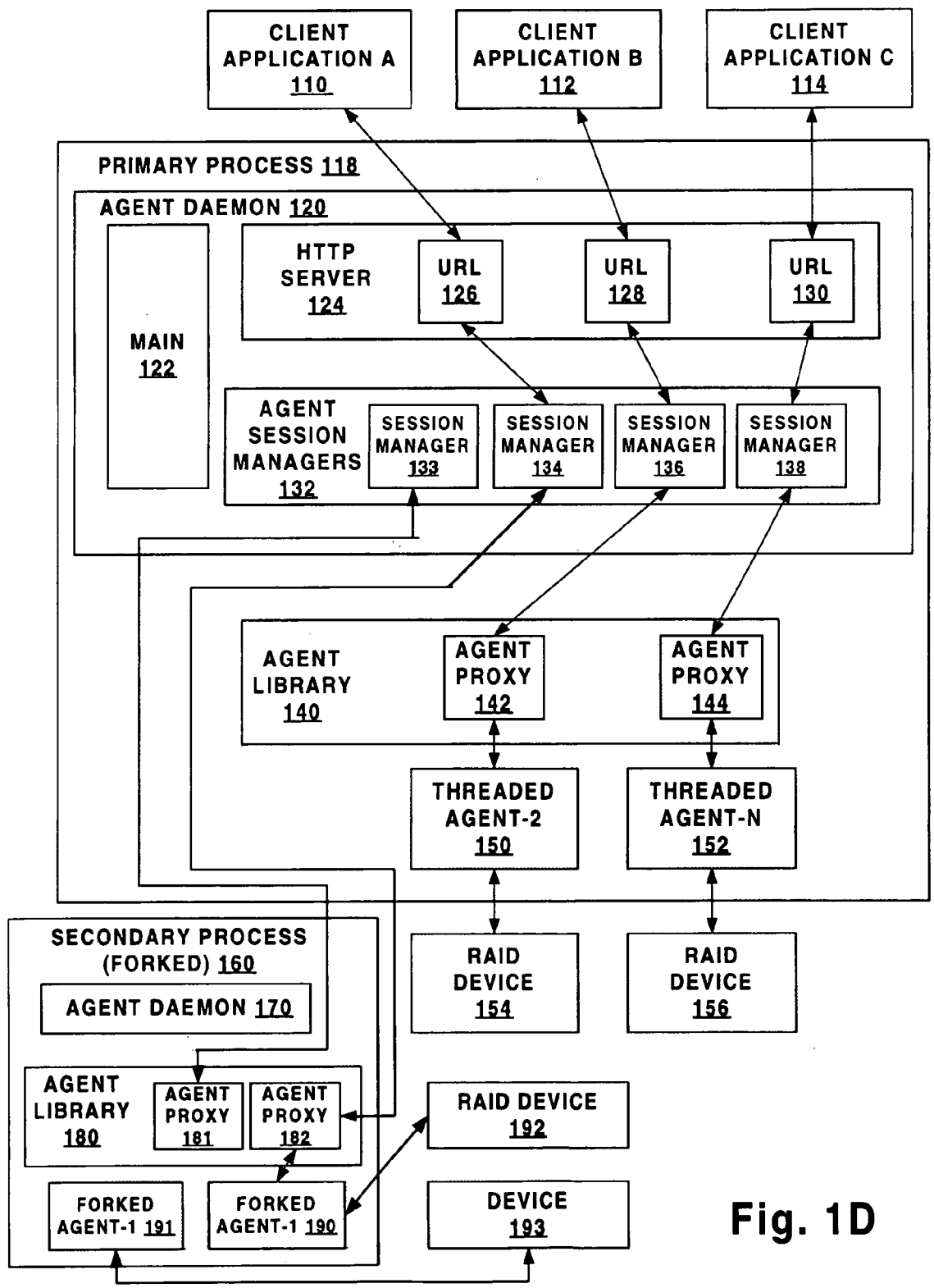
FIG. 1D illustrates a group of forked agents in accordance with certain implementations of the invention.

For ease of illustration, only one forked agent-1 190 has been illustrated in secondary process 160. FIG. 1D illustrates a group of forked agents in accordance with certain implementations. For example, there could be additional session managers in primary process 118 (e.g., session manager 133), each of which is linked to an agent proxy (e.g., agent proxy 181) in the secondary process 160. Each of the agent proxies in the secondary process 160 may be linked to a forked agent (e.g., forked agent 191) that is lined to a device (e.g., device 193). The forked agents (190 and 191) within the secondary process 160 are said to form a group of agents. In certain implementations, the group of agents share an address space other than the address space of the primary process. In certain implementations, agents may be forked from the secondary process 160 to additional processes (e.g., to a third process).

Figure 2A:
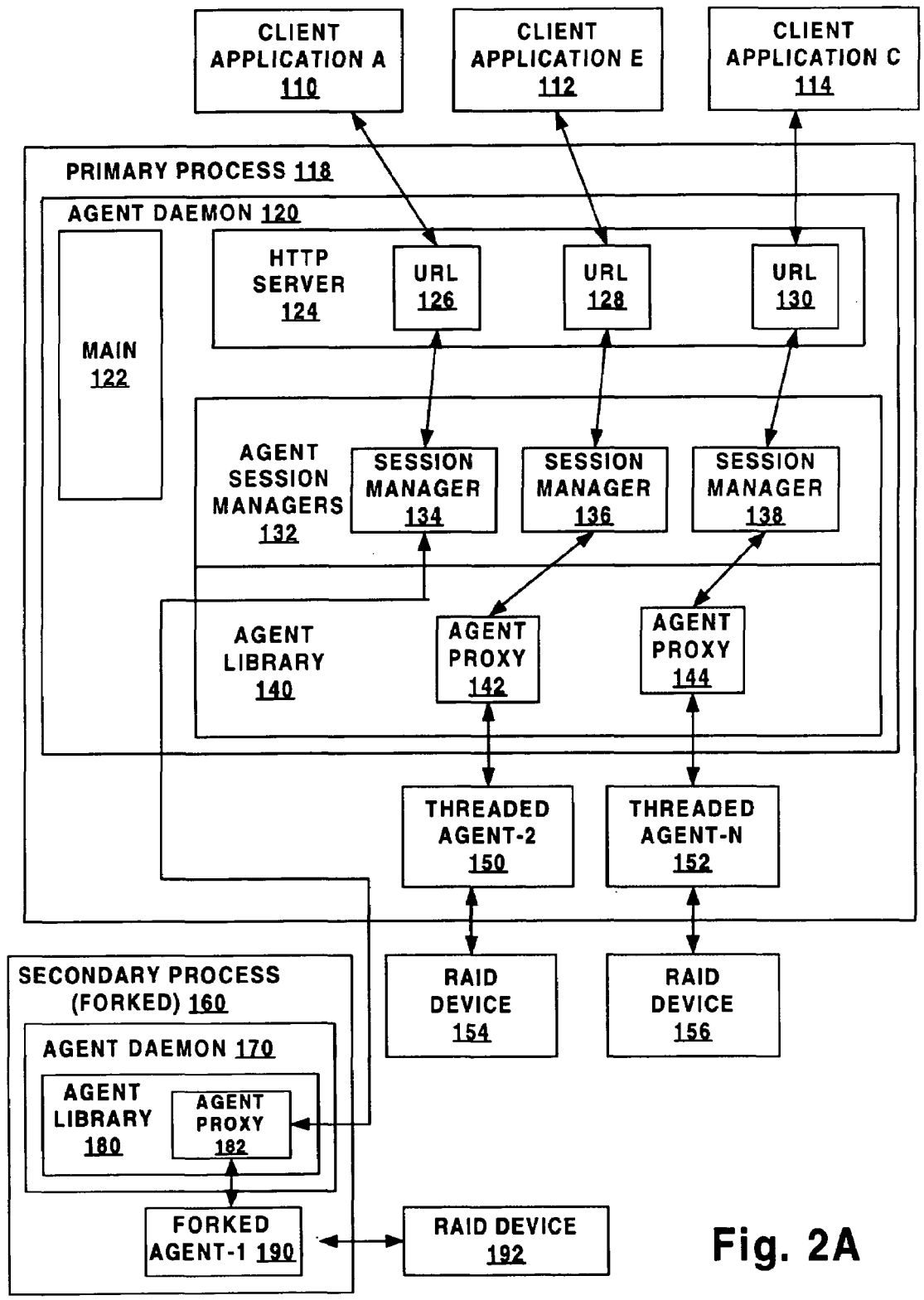
FIGS. 2A and 2B illustrate, in block diagrams, an alternative architecture in which the invention may be implemented in accordance with certain implementations of the invention
Figure 2B:
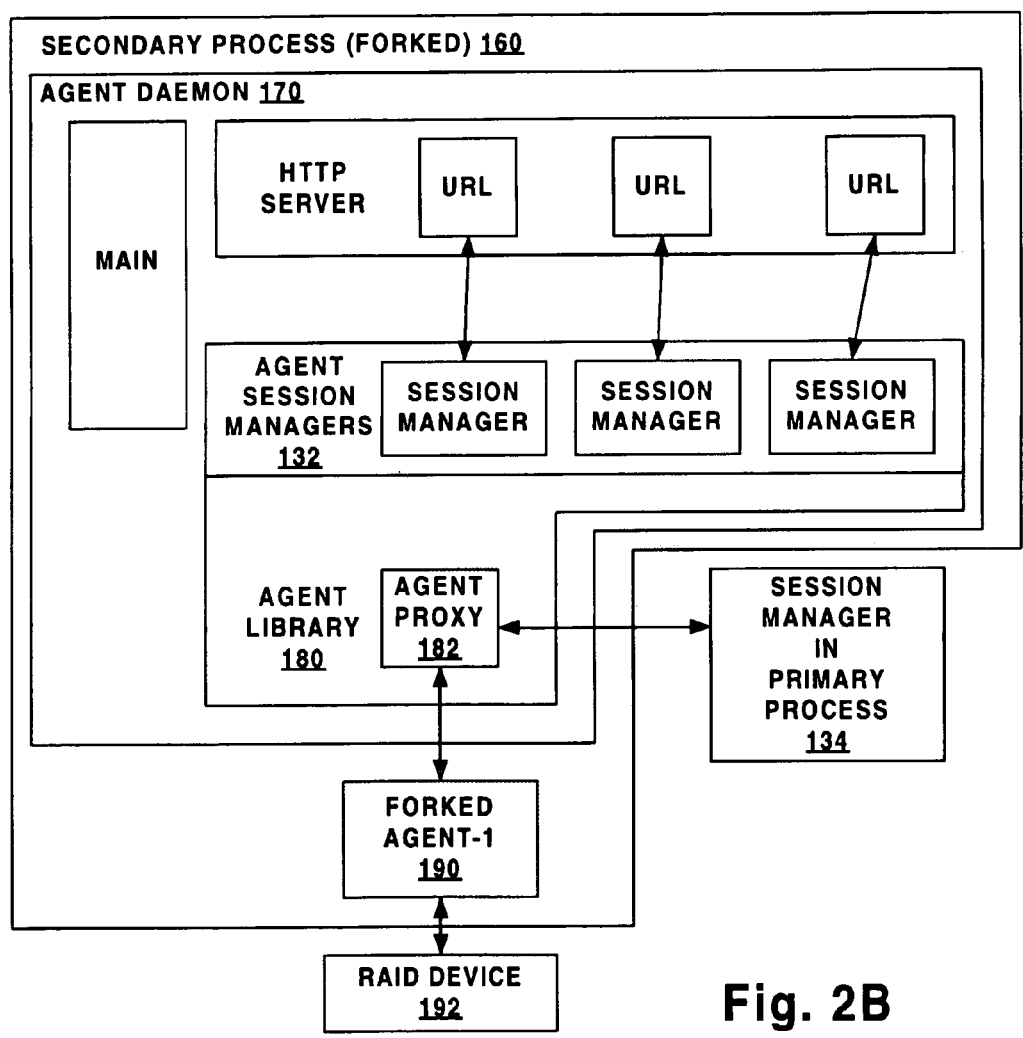

FIGS. 2A and 2B illustrate, in block diagrams, an alternative architecture in which the invention may be implemented in accordance with certain implementations. In particular, in FIGS. 2A and 2B the functionality of agent session managers 132 and 140 in the primary process may be combined.

Figure 3A:
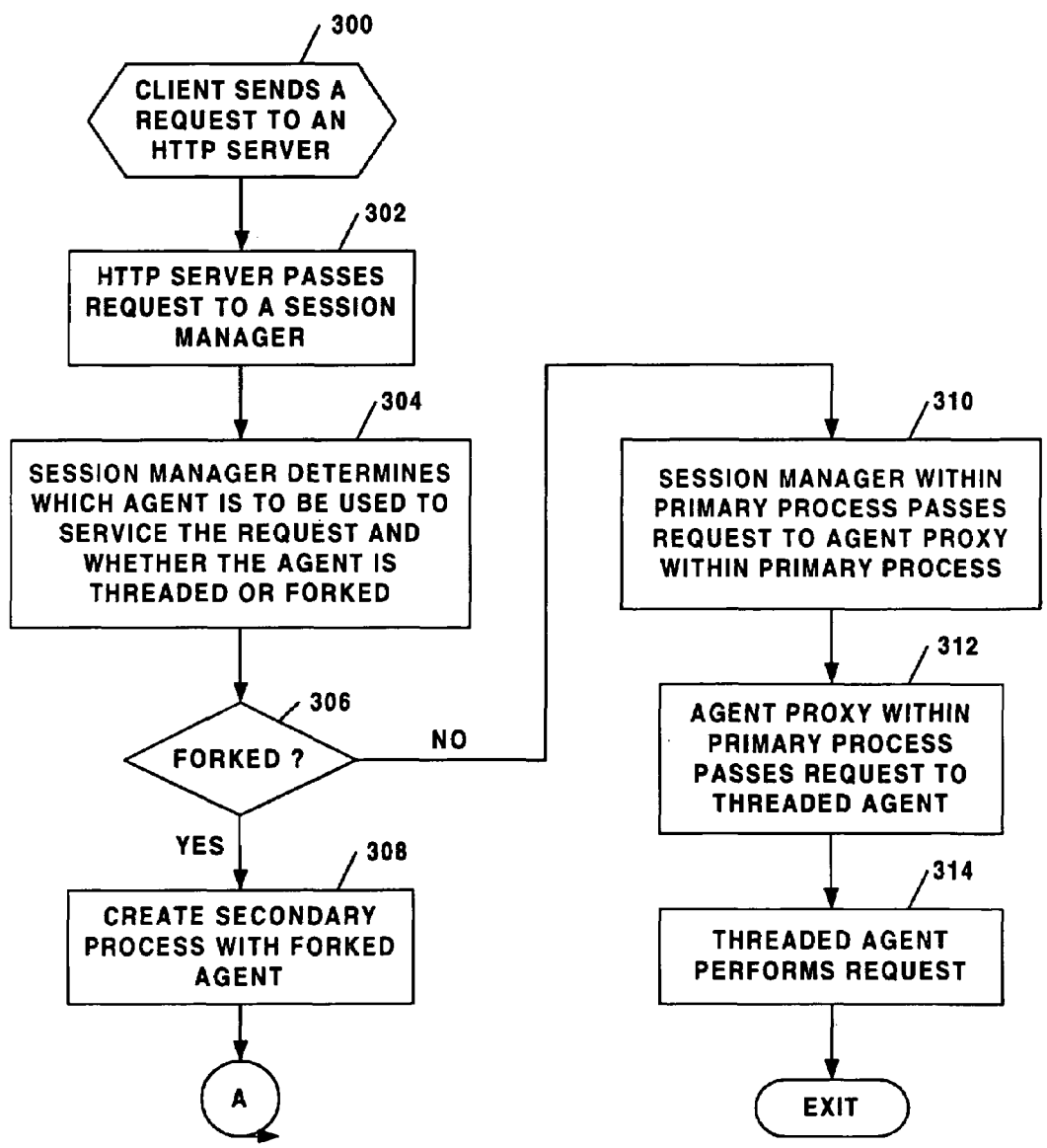
FIGS. 3A and 3B illustrate logic performed when a process is started in accordance with certain implementations of the invention
Figure 3B:
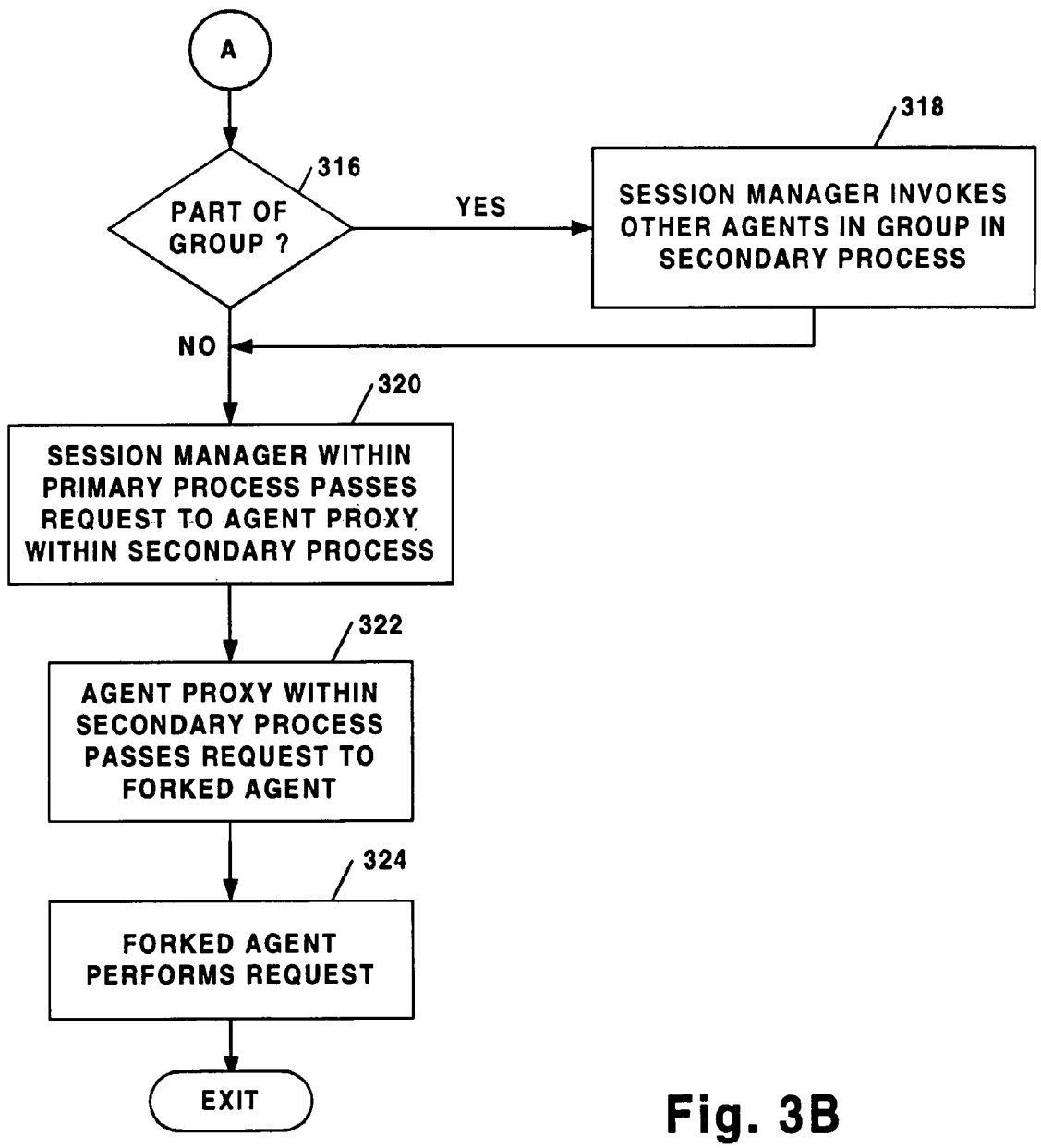

FIGS. 3A and 3B illustrate logic performed when a process is started in accordance with certain implementations. Control begins at block 300 when a client application 110, 112, or 114 sends a request to an HTTP server 124. The HTTP server 124 passes the request to a session manager 134, 136, or 138 (block 302). The session manager 134, 136, or 138 determines which agent 150, 152, or 190 is to be to be used to service the request and whether the agent 150, 152, or 190 is threaded or forked (block 304). In certain implementations, a system administrator designates which agents 150, 152, or 190 are to be forked and indicates the designation of threaded or forked in a configuration file, and the session manager 134, 136, or 138 uses the configuration file to make its determination. If the agent is forked (block 306), processing continues to block 308, otherwise, processing continues to block 310.

When an agent is threaded, the session manager 136 or 138 within a primary process 118 passes the request to an agent proxy 142 or 144 within the primary process 118 (block 310). The agent proxy 142 or 144 within the primary process 118 passes the request to the threaded agent 150 or 152 (block 312). The threaded agent 150 or 152 performs the request (block 314).

When an agent is forked, the session manager 134 within a primary process 118 creates a secondary process 160 that includes the forked agent 190 (block 308). The session manager 134 within the primary process 118 determines whether the forked agent 190 is in a group of agents, by for example, using a configuration file (block 316). If so, processing continues to block 318, otherwise, processing continues to block 320. In block 318, the session manager, 134 invokes other agents in the group in the secondary process 160. Then, the session manager 134 within the primary process 118 passes the request to an agent proxy 182 within the secondary process 160 (block 320). The agent proxy 182 within the secondary process 160 passes the request to the forked agent 190 (block 322). The forked agent 190 performs the request (block 324), by, for example accessing RAID device 192.

Figure 4:
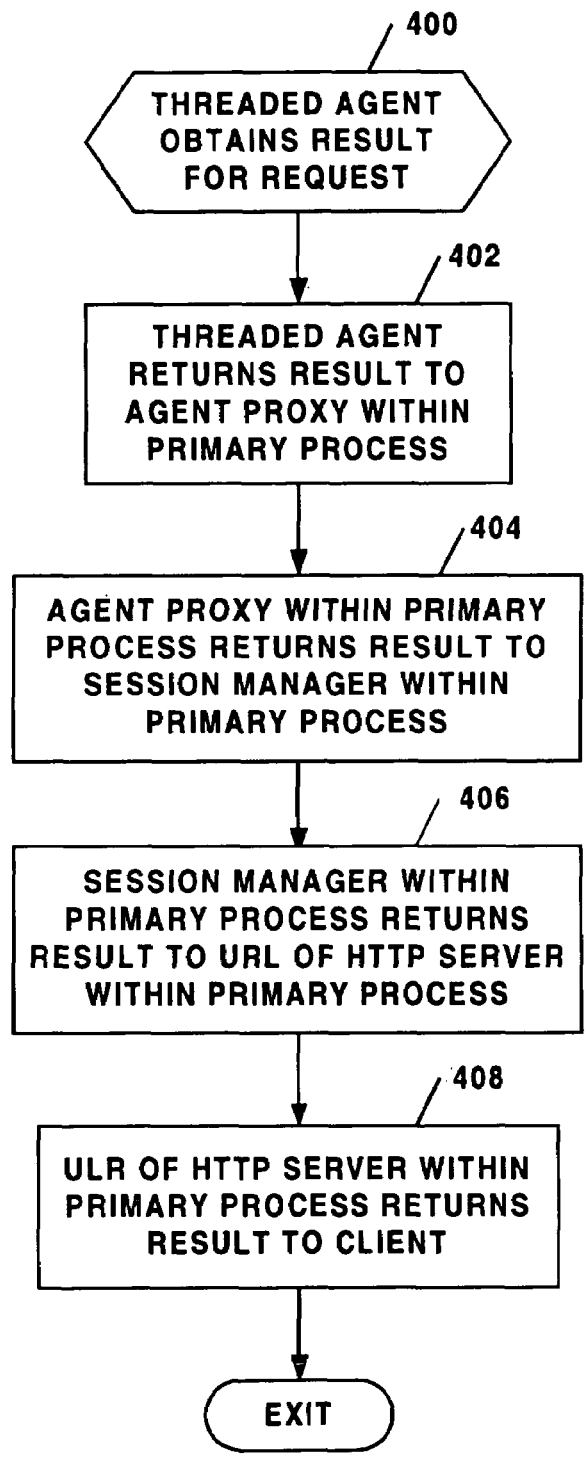
FIG. 4 illustrates logic performed to return a result to a client from a threaded agent in accordance with certain implementations of the invention.

FIG. 4 illustrates logic performed to return a result to a client application 112 or 114 from a threaded agent 150 or 152 in accordance with certain implementations of the invention. Control begins at block 400 with a threaded agent 150 or 152 obtaining a result for a client request. The threaded agent 150 or 152 returns the result to an agent proxy 142 or 144 within the primary process 118 (block 402). The agent proxy 142 or 144 within the primary process 118 returns the result to a session manager 136 or 138 within the primary process 118 (block 404). The session manager 136 or 138 within the primary process 118 returns the result to a URL 128 or 130 of an HTTP server 124 within the primary process 118 (block 406). The URL 128 or 130 of HTTP server 124 within the primary process 118 returns the result to the client application 112 or 114 (block 408).

Figure 5:
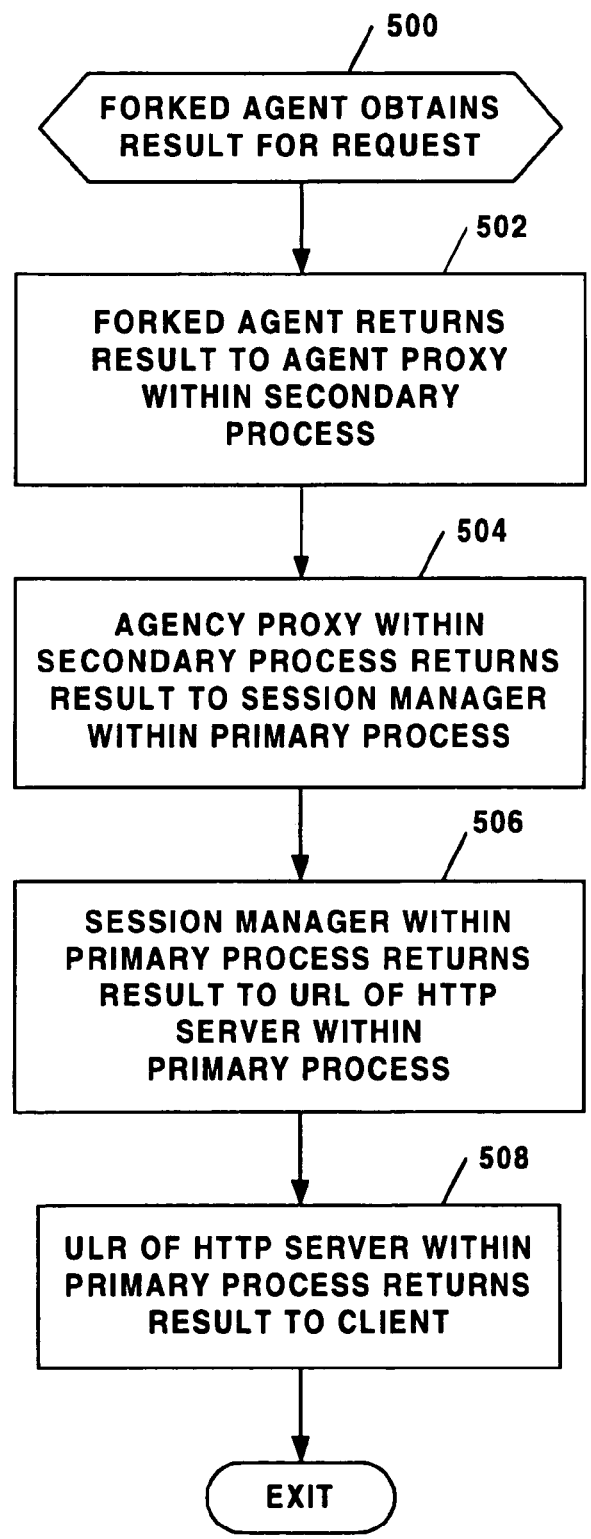
FIG. 5 illustrates logic performed to return a result to a client from a forked agent in accordance with certain implementations of the invention.

FIG. 5 illustrates logic performed to return a result to a client application 110 from a forked agent 190 in accordance with certain implementations of the invention. Control begins at block 500 with a forked agent 190 obtaining a result for a client request. The forked agent 190 returns the result to an agent proxy 182 within the secondary process 160 (block 502). The agent proxy 182 within the secondary process 160 returns the result to a session manager 134 within the primary process 118 (block 504). The session manager 134 within the primary process 118 returns the result to a URL 126 of an HTTP server 124 within the primary process 118 (block 506). The URL 126 of HTTP server 124 within the primary process 118 returns the result to the client application 110 (block 508).

Figure 6:
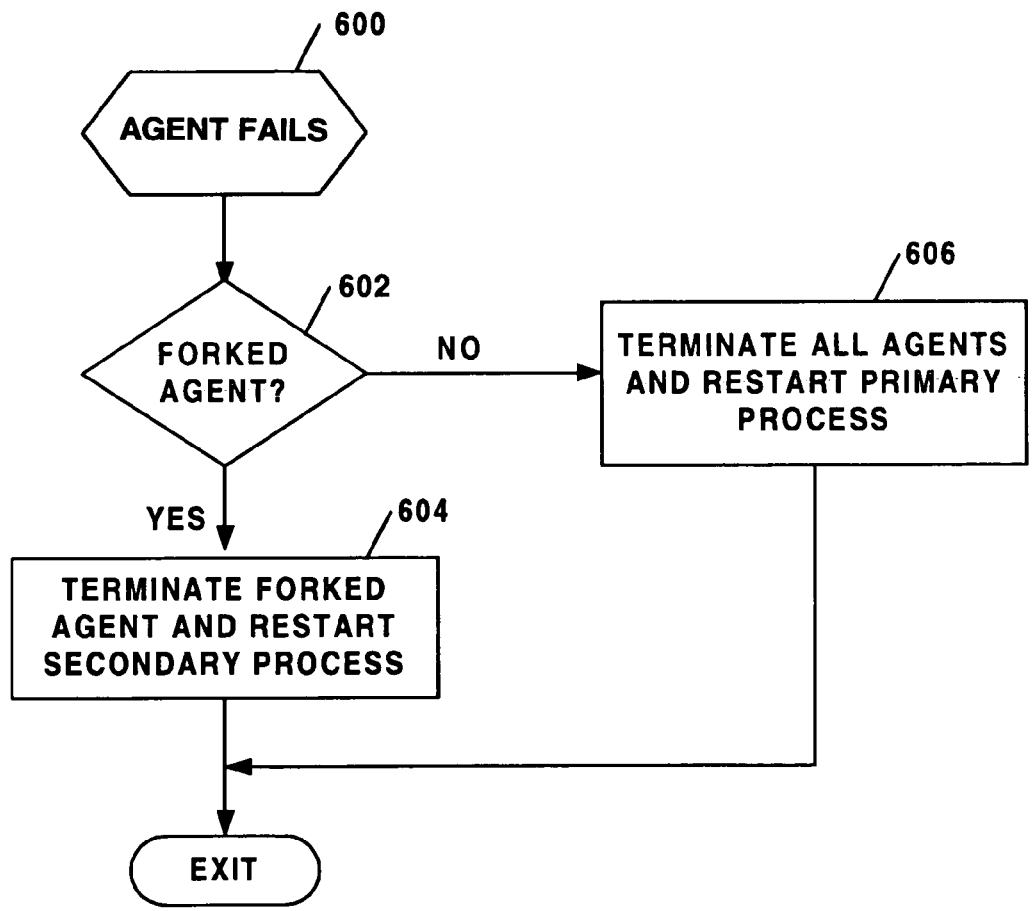
FIG. 6 illustrates logic performed when an agent fails in accordance with certain implementations of the invention.

FIG. 6 illustrates logic performed when an agent 110, 112, or 114 fails in accordance with certain implementations of the invention. Control begins at block 600 with an agent 110, 112, or 114 failing. In block 602, it is determined whether the agent that failed is a forked agent 190. If so, processing continues to block 604. Otherwise, processing continues to block 606. In block 604, the forked agent 190 is terminated and the secondary process 160 is restarted. With the described implementation, the termination of the forked agent 190 does not require termination of other agents 150 or 152 or the primary process 118. In block 606, if the agent was threaded, all agents 150, 152, and 190 are terminated and the primary process 118 is restarted.

Figure 7:
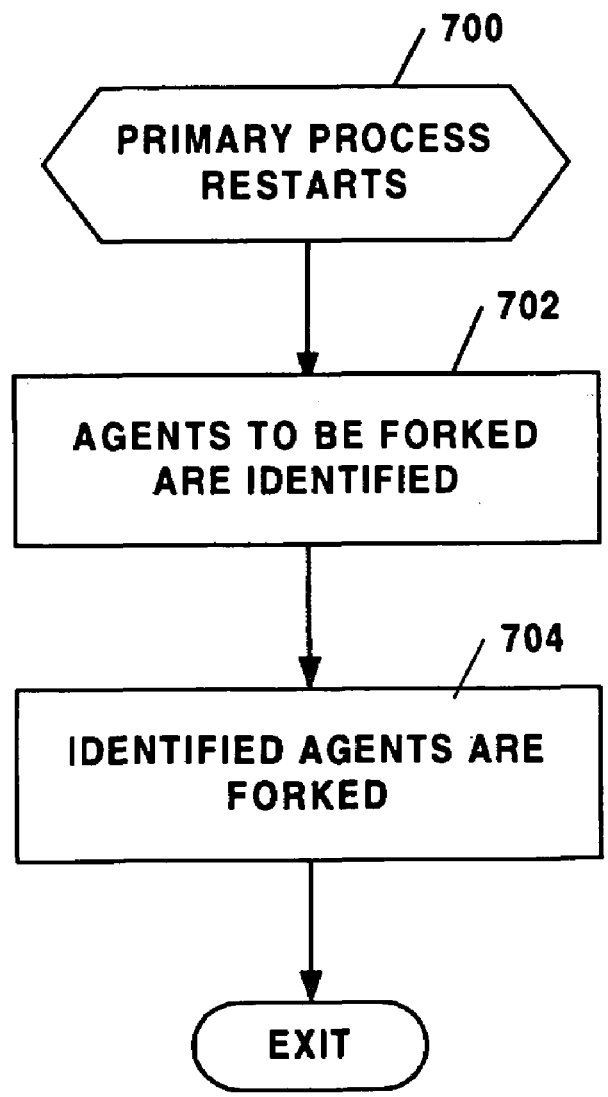
FIG. 7 illustrates logic performed for identifying agents to be forked after a primary process is restarted in accordance with certain implementations of the invention

FIG. 7 illustrates logic performed for identifying agents 110, 112, or 114 to be forked after a primary process 118 is restarted in accordance with certain implementations of the invention. Control begins at block 700 with the primary process 1 18 restarting. The primary process 1 18 is restarted due to failure of the primary process 118 during an earlier execution. For example, the primary process 118 may have failed due to a threaded agent 150 or 152 failing. In certain implementations, if an agent 150, 152, or 190 fails, data is stored on the status of all of the agents 150, 152, and 190. The data indicates which of the threaded and forked agents 150, 152, and 190 successfully completed their functions, which failed, and which were continuing processing at time of failure. In certain implementations, data may be stored on just the one or more agents 150, 152 or 190 that failed. The data is stored in a file that is persistent across process terminations (e.g., system crashes).

When the primary process 1 18 restarts, the primary process 118 is able to access the data. In particular, each session manager 134, 136, or 138 uses the data to determine whether an agent 110, 112 or 114 should be forked (block 702). For example, if a threaded agent 112 or 114 failed previously, upon restart, whichever session manager 136 or 138 that is determining whether that agent 112 or 114 should be forked, may designate that agent 112 or 114 as a forked agent when the primary process 118 restarts due to that agent's 112 or 114 previously failure. Additionally, if a forked agent 190 did not fail, the session manager 134, 136 or 138 may designate that agent as a threaded agent when the primary process 118 restarts. Then, the agents designated as forked agents are forked (block 704). In certain implementations, the determination of which agents should be forked may be made by an agent daemon, a session manager, or an agent library, or by some combination of these components.

Figure 8:
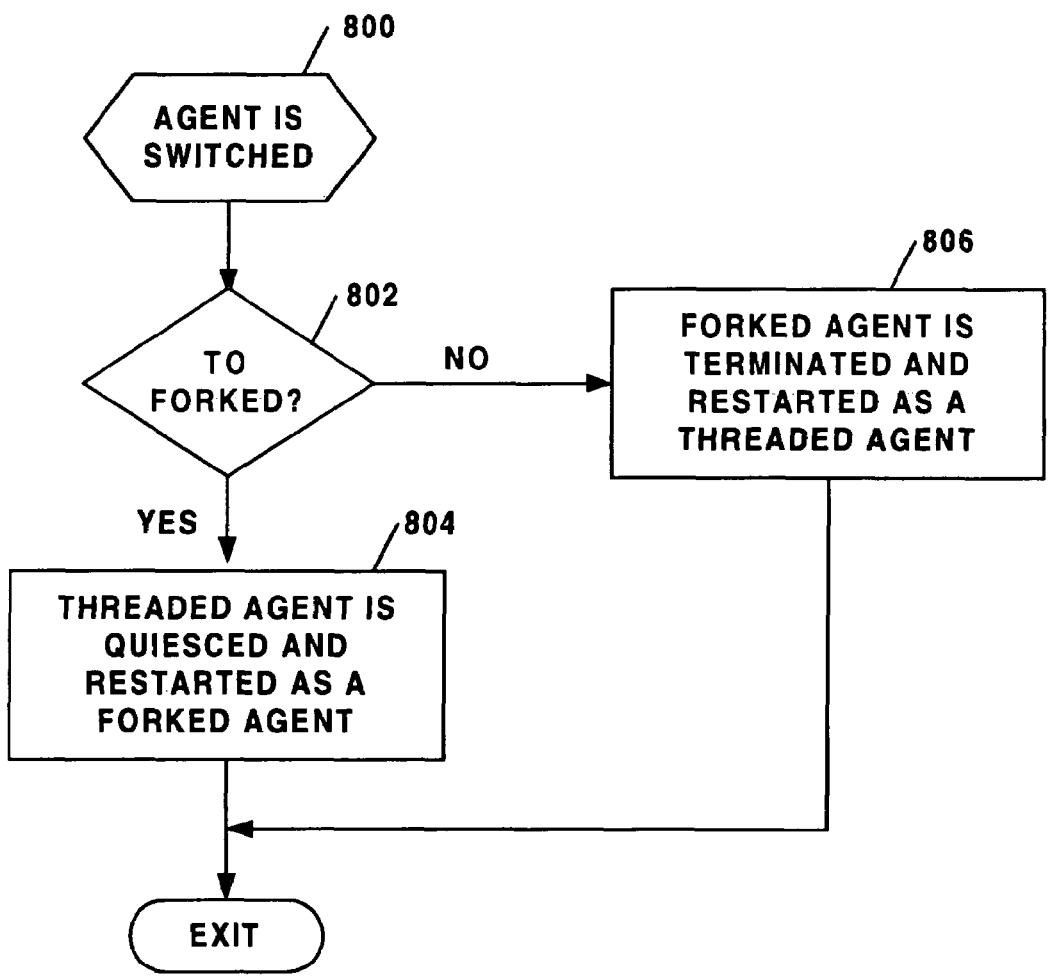
FIG. 8 illustrates logic for switching an executing agent from one designation to another (e.g., from forked to threaded or threaded to forked) in accordance with certain implementations of the invention.

FIG. 8 illustrates logic for switching an executing agent 150, 152 or 190 from one designation to another (e.g., from forked to threaded or threaded to forked) in accordance with certain implementations of the invention. Control begins at block 800 with an agent's 150, 152 or 190 designation being switched. In certain implementations, a user interface is provided that allows, for example, a system administrator to switch an agent's 150, 152 or 190 designation. A system administrator may switch an agent's 150, 152 or 190 designation based on information provided through the user interface, such as which low level device the agent 150, 152 or 190 is accessing. In certain implementations, a system administrator may switch an agent's 150, 152 or 190 designation by modifying a configuration file, and, in this case, the session manager 134, 136 or 138 monitors changes to the configuration file.

In block 802, it is determined whether the agent 150, 152 or 190 is being switched from a threaded agent 150 or 152 to a forked agent. If so, processing continues at block 804, otherwise, processing continues at block 806. In block 804, the threaded agent 150 or 152 is quiesced and then restarted as a forked agent. In block 806, since a forked agent 190 is being switched to a threaded agent, the forked agent 190 is terminated and restarted as a threaded agent. In particular, the agent API includes a quiesce method that may be invoked to tell a threaded agent 150 or 152 to temporarily stop processing and prepare data for restarting. When the threaded agent 150 or 152 is restarted as a forked agent, the forked agent uses the prepared data to restart at a point at which processing had been quiesced.

In certain implementations, when a forked agent 190 is to be switched to a threaded agent, if the forked agent 190 is part of a group of agents, only the forked agent 190 is switched. In certain implementations, when a forked agent 190 is to be switched to a threaded agent, if the forked agent 190 is part of a group of agents, all of the forked agents in the group are switched to threaded agents.

In certain implementations, the agents are Common Information Model (CIM) providers in a CIM environment. CIM is a standard for an object-oriented model for managing information. The CIM standard is provided by the Distributed Management Task Force, Inc. (DMTF). For further information on the CIM standard, see "Specifications for CIM Operations over HTTP," Version 1.1, May 2, 2002, from the DMTF, which is incorporated by reference herein in its entirety.

Figure 9:
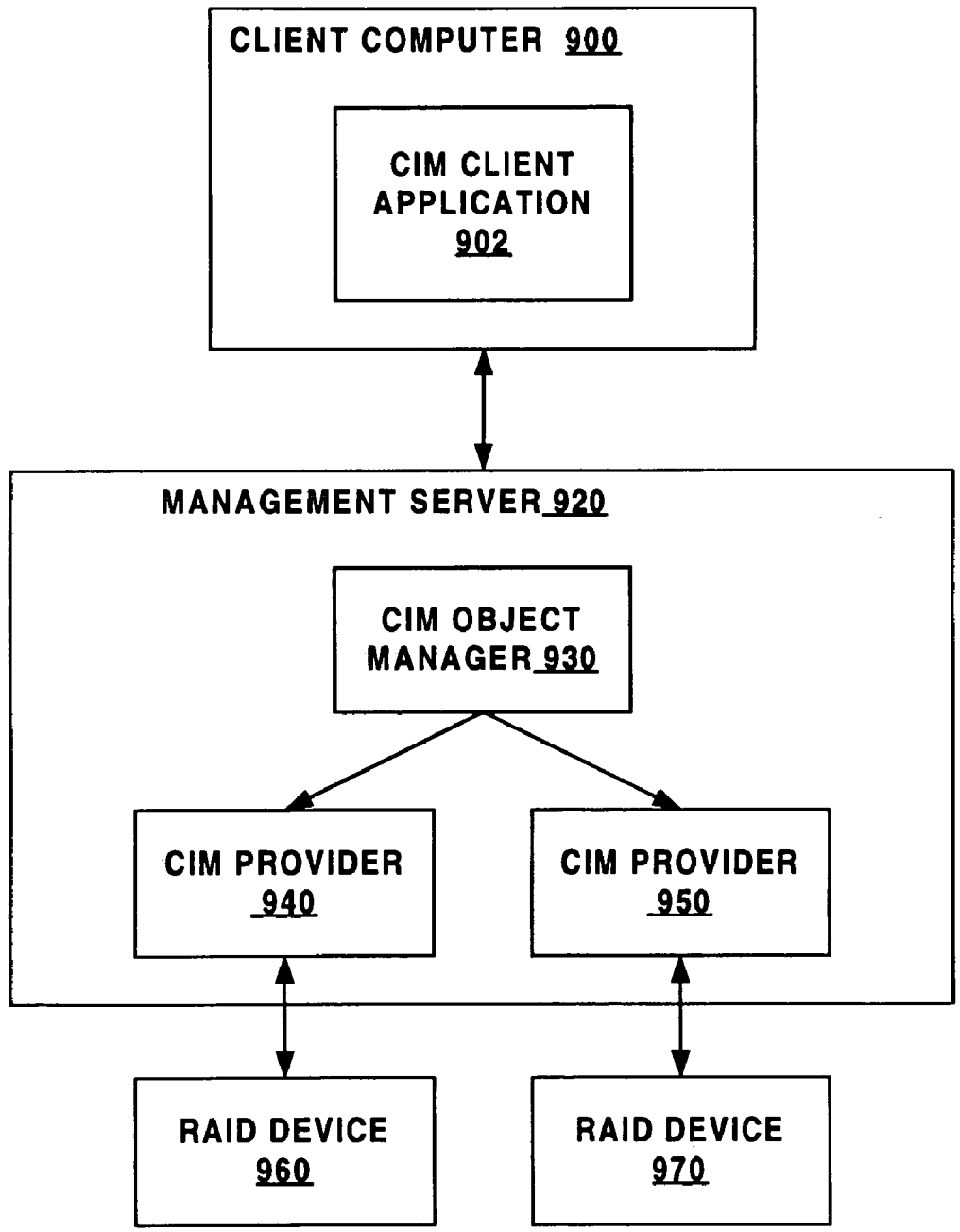
FIG. 9 illustrates, in a block diagram, a CIM environment in accordance with certain implementations of the invention.

FIG. 9 illustrates, in a block diagram, a CIM environment in accordance with certain implementations of the invention. A client computer 900 executes a CIM client application 902. The client computer 900 is connected to a management server 920. The management server 920 includes a CIM object manager 930. The CIM object manager 930 passes requests received from a CIM client application 902 for objects stored on RAID device 960 to CIM provider 940 and passes requests for objects stored on RAID device 970 to CIM provider 950. In certain implementations of the invention, the CIM object manager 930 may be replaced with the agent daemon 120 and agent library 140. The threaded and forked agents 150, 152, and 190 may replace the CIM providers 940 and 950.

UNIX is a registered trademark of the Open Group.

Additional Implementation Details

The above described implementations for creating consistent copies may be implemented using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In alternative implementations, the HTTP server 124 may be replaced with any socket interface.

In certain implementations, rather than the session managers 134, 136, and 138, other components, such as the agent proxies 142, 144, and 182 may determine which agent should process a request and/or whether the agent should be forked or threaded.

The logic of FIGS. 3A, 3B, and 4–8 describe specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 3A, 3B, and 4–8 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

Figure 10:
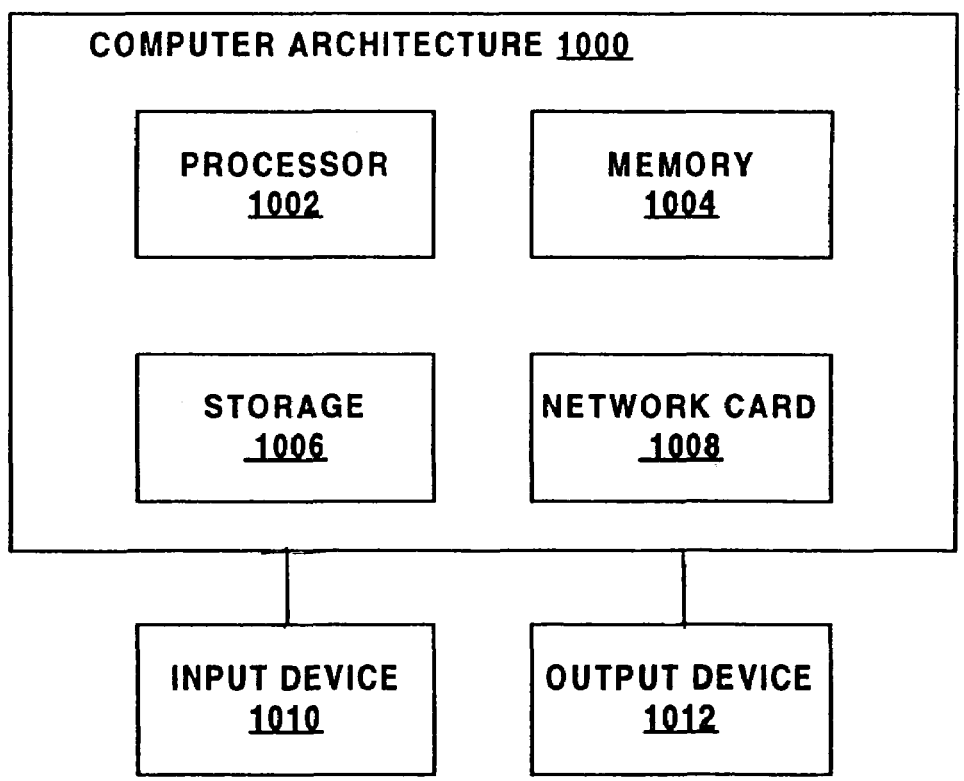
FIG. 10 illustrates one implementation of the architecture of the computer systems in accordance with certain implementations of the invention

FIG. 10 illustrates one implementation of the architecture of the computer systems 100 and 102 in accordance with certain implementations of the invention. The computer systems 100 and 102 may implement a computer architecture 1000 having a processor 1002 (e.g., a microprocessor), a memory 1004 (e.g., a volatile memory device), and storage 1006 (e.g., a non-volatile storage, such as magnetic disk drives, optical disk drives, a tape drive, etc.). The storage 1006 may comprise an internal storage device or an attached or network accessible storage. Programs in the storage 1006 are loaded into the memory 1004 and executed by the processor 1002 in a manner known in the art. The architecture further includes a network card 1008 to enable communication with a network. An input device 1010 is used to provide user input to the processor 1002, and may include a keyboard, mouse, pen-stylus, microphone, touch sensitive display screen, or any other activation or input mechanism known in the art. An output device 1012 is capable of rendering information transmitted from the processor 1002, or other component, such as a display monitor, printer, storage, etc.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method in a computer system for processing a request for information concerning a hardware device generated at a client with an invoking process executing in a server, the method comprising:
    identifying an agent that may process the request by accessing the hardware device;
    determining whether the agent should be executed within an address space of the invoking process that would invoke the agent or within a separate address space in the server;
    if it is determined that the agent should be executed within a separate address space, executing the agent within a separate address space;
    following a failure and restarting of the invoking process, using the invoking process to make a determination whether to execute the identified agent within the invoking process address space or within a separate address space based on the performance of the agent when the agent was executing;
    when the invoking process is restarted:
        determining which agents are to be executed in one or more separate address spaces based on performance information of those agents when they were executing stored by the invoking process during the execution of those agents; and
        executing those agents in the one or more separate address spaces;
    wherein the agent is a Common Information Model (CIM) provider; and
    wherein the invoking process is a CIM object manager.

2. The method of claim 1, further comprising:
    receiving an indication to switch an agent that is executing within the separate address space to an agent that is executing within the address space of the invoking process that invoked the agent;
    terminating the agent to be switched; and
    executing the agent within the address space of the invoking process.

3. The method of claim 1, wherein the agent is part of a group of agents and further comprising:
    terminating each of the agents in the group; and
    executing each of the agents in the group within the address space of the invoking process that invoked the agents.

4. The method of claim 1, further comprising:
    receiving an indication to switch the agent that is executing within the address space of an invoking process that invoked the agent to the agent that is executing in a separate address space;
    quiescing the agent that is executing within the address space of the invoking process; and
    executing the agent within the separate address space.

5. The method of claim 1 wherein, following a failure and restarting of the invoking process, the determination whether to execute the identified agent within the invoking process address space or within a separate address space comprises executing the identified agent in the separate address space when the agents fails while executing in the invoking process address space.

6. The method of claim 1 wherein, following a failure and restarting of the invoking process, the determination whether to execute the identified agent within the invoking process address space or within a separate address space comprises executing the identified agent in the invoking process address space when the agent completes successfully while executing in the separate address space.

7. A system operating in a server of a computer system for processing a request generated at a client computer for information concerning a hardware device of the computer system, the system comprising:
    a session manager executing in the server;
    one or more agents in the server;
    one or more invoking processes that can invoke the agents to execute in the server;
    means at the session manager for identifying which agent may process the request by accessing the hardware device;
    determining at the session manager whether the identified agent should be executed within an address space of an invoking process or within a separate address space in the server;
    if it is determined that the agent should be executed within a separate address space, executing the agent within a separate address space; and
    means in the session manager and operable following a failure and restarting of the invoking process, for making a determination whether to execute the identified agent within the invoking process address space or within a separate address space based on the performance of the agent when the agent was executing;
    when the invoking process is restarted:
        means for determining which agents are to be executed in one or more separate address spaces based on performance information of those agents when they were executing stored by the invoking process during the execution of those agents; and
        means for executing those agents in the one or more separate address spaces;
    wherein each of the agents is a Common Information Model (CIM) provider; and
    wherein each of the invoking processes is a CIM object manager.

8. The system of claim 7, further comprising:
    means for receiving an indication to switch an agent that is executing within the separate address space to an agent that is executing within the address space of the invoking process that invoked the agent;
    means for terminating the agent to be switched; and
    means for executing the agent within the address space of the invoking process.

9. The system of claim 7, wherein the agent is part of a group of agents and further comprising:
   means for terminating each of the agents in the group; and
   means for executing each of the agents in the group within the address space of the invoking process that invoked the agents.

10. The system of claim 7, further comprising:
    means for receiving an indication to switch the agent that is executing within the address space of an invoking process that invoked the agent to the agent that is executing in a separate address space;
    means for quiescing the agent that is executing within the address space of the invoking process; and
    means for executing the agent within the separate address space.

11. The system of claim 7 wherein the means operable following a failure and restarting of the invoking process, for making the determination whether to execute the identified agent within the invoking process address space or within a separate address space comprises means for executing the identified agent in the separate address space when the agents fails while executing in the invoking process address space.

12. The system of claim 7 wherein the means operable following a failure and restarting of the invoking process, for making the determination whether to execute the identified agent within the invoking process address space or within a separate address space comprises means for executing the identified agent in the invoking process address space when the agent completes successfully while executing in the separate address space.

13. An article of manufacture comprising a storage medium having computer readable program code thereon including instructions for processing a request for information concerning a hardware device with an invoking a process executing in a server, wherein the program code is capable of causing operations in the processor of a computer system, the operations comprising:
    identifying an agent that may process the request by accessing the hardware device;
    determining whether the agent should be executed within an address space of an the invoking process that would invoke the agent or within a separate address space in the server;
    if it is determined that the agent should be executed within a separate address space, executing the agent within a separate address space;
    following a failure and restarting of the invoking process using the invoking process to make a determination whether to execute the identified agent within the invoking process address space or within a separate address space based on the performance of the agent when the agent was executing; and
    when the invoking process is restarted:
        determining which agents are to be executed in one or more separate address spaces based on performance information of those agents when they were executing stored by the invoking process during the execution of those agents; and
        executing those agents in the one or more separate address spaces; wherein the agent is a Common Information Model (CIM) provider; and wherein the invoking process is a CIM object manager.

14. The article of manufacture of claim 13, the operations further comprising:
    receiving an indication to switch an agent that is executing within the separate address space to an agent that is executing within the address space of the invoking process that invoked the agent;
    terminating the agent to be switched; and
    executing the agent within the address space of the invoking process.

15. The article of manufacture of claim 13, wherein the agent is part of a group of agents and the operations further comprising:
    terminating each of the agents in the group; and
    executing each of the agents in the group within the address space of the invoking process that invoked the agents.

16. The article of manufacture of claim 13, the operations further comprising:
    receiving an indication to switch the agent that is executing within the address space of an invoking process that invoked the agent to the agent that is executing in a separate address space;
    quiescing the agent that is executing within the address space of the invoking process; and
    executing the agent within the separate address space.

17. The article of manufacture of claim 13 wherein, following a failure and restarting of the invoking process, the determination whether to execute the identified agent within the invoking process address space or within a separate address space comprises executing the identified agent in the separate address space when the agents fails while executing in the invoking process address space.

18. The article of manufacture of claim 13 wherein, following a failure and restarting of the invoking process, the determination whether to execute the identified agent within the invoking process address space or within a separate address space comprises executing the identified agent in the invoking process address space when the agent completes successfully while executing in the separate address space.

* * * * *